United States Patent Office

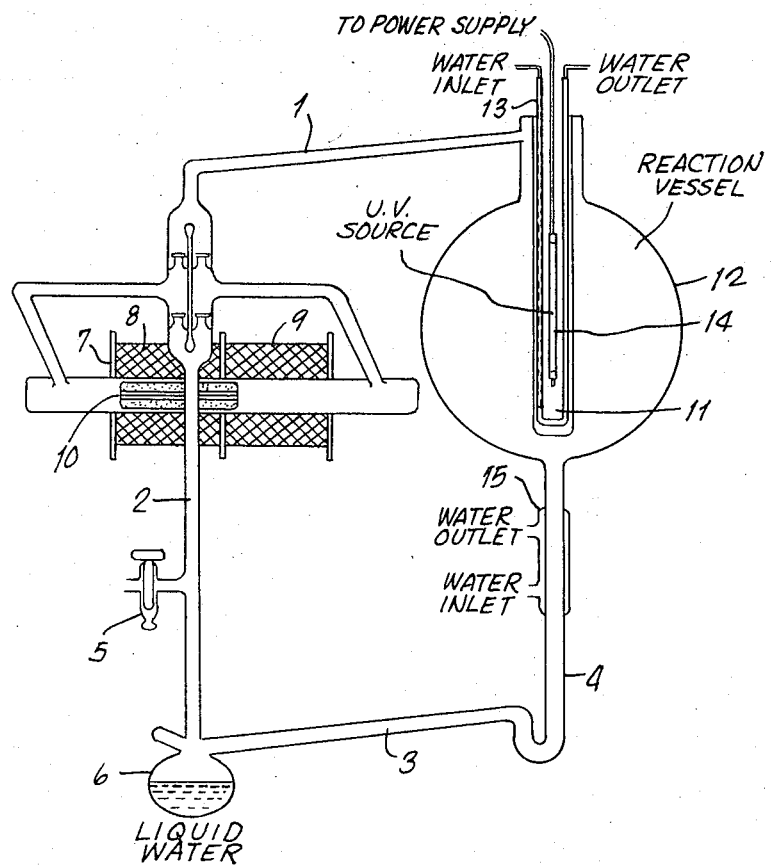

3,756,934
Patented Sept. 4, 1973

3,756,934
PRODUCTION OF AMINO ACIDS FROM GASEOUS MIXTURES USING ULTRAVIOLET LIGHT
Carl Edward Sagan, Pasadena, Calif., and Bishun N. Khare, Ithaca, N.Y., assignors to Cornell University, Ithaca, N.Y.
Filed Feb. 22, 1972, Ser. No. 228,066
Int. Cl. B01j 1/10
U.S. Cl. 204—162 R     9 Claims

ABSTRACT OF THE DISCLOSURE

Amino acids are produced by exposing a precursor gaseous mixture containing a nitrogen source such as ammonia or nitrogen, water vapor and a hydrocarbon containing from two to eight carbon atoms together with a near ultraviolet photon acceptor which will dissociate with the production of sufficient energy to effect bond dissociation of the ingredients in the precursor gaseous mixture thereby to initiate chain reactions resulting in the production of amino acids.

---

The invention described herein was made in the performance of NASA Grant No. NGR33-010-101 and is subject to the provisions of Section 305 of the National Aeronautics and Space Act of 1958 (72 Stat. 435; 42 USC 2457).

BACKGROUND OF INVENTION

This invention is concerned with the production of amino acids from gaseous mixtures. Amino acids are a well known naturally occurring class of chemicals which are widely employed for a variety of purposes. Many of them are essential nutrients for man and are often employed as dietary supplements. They are difficult and expensive to produce with the result that they are not always readily available at acceptable prices.

THE INVENTION

It has now been discovered that amino acids can be conveniently produced from readily available materials using inexpensive energy sources. In accordance with this invention the desired products are produced by exposing a precursor gaseous mixture containing water vapor, a hydrocarbon, and a source of nitrogen to electromagnetic energy in the near ultraviolet region of the spectrum. The initial mixture will additionally contain a substance which is a photon acceptor in the defined energy region and will dissociate with the production of sufficient energy to effect bond dissociation of the ingredients in the original mixture so as to initiate chain reactions which ultimately terminate in the production of amino acids. Often at least some of the amino acids are combined in the form of relatively low molecular weight polypeptides. The constituent amino acids of the peptides can readily be released, for example by acid hydrolysis. They are readily isolated by standard techniques such as extraction or chromatography.

The ingredients of the precursor mixtures used in this invention, with the exception of the photon acceptor are all essentially transparent in the near ultraviolet, and therefore essentially inert in the presence of this type of electromagnetic energy. It is the presence of the photon acceptor in the original mix which makes possible the production of the valuable amino acids. The photon acceptor thus makes it possible to use very inexpensive sources of energy for the process. An ordinary germicidal lamp would be an acceptable source, although for continuous, commercial production more elaborate and efficient sources might be desirable.

The amino acids produced by the process of this invention are racemic mixtures containing both the D- and the L-form. If desired the isomers can be separated by standard procedures.

All amino acids, as is known, contain carbon, hydrogen, oxygen and nitrogen. The initial gaseous mixture used in the process of the invention must therefore contain a source of each of these elements. The preferred source for nitrogen is ammonia although gaseous nitrogen may also be employed. Water vapor provides an excellent and inexpensive source of hydrogen. Aliphatic hydrocarbons containing at least two carbon atoms and suitably up to about eight carbon atoms are useful sources of carbon. Methane may be mixed with the hydrocarbon source to provide an inexpensive carbon source although a carbon source containing at least two carbon atoms is essential to the practice of the invention. The preferred hydrocarbons are those containing from 2–4 carbon atoms. Natural gas is an excellent and inexpensive carbon source. All of these components of the original mixture, with the exception of nitrogen gas, provide hydrogen atoms.

The amino acids produced by the process of the invention include aliphatic, aromatic and heterocyclic amino acids. For the production of amino acids containing sulfur such as cystine and methionine it will naturally be necessary to provide a source of sulfur. An excellent source of sulfur is hydrogen sulfide since this substance may also function as a photon acceptor. Sulfur dioxide may also be employed.

Hydrogen sulfide has a broad absorption continuum beginning at about 2700 A. and continuing down to the vacuum ultraviolet. Dissociation of hydrogen sulfide may be effected, for example, by exposure to incident 2537 A. radiation. The dissociation energy of the HS—H bond is 85–95 kcal./mole. The energy of a 2537 A. photon producing a photon dissociation event leaves an excess energy of 18–28 kcal./mole and 97% of this excess energy is converted into transitional kinetic energy of the hydrogen atom. Thus 2537 A. photon dissociation of hydrogen sulfide produces hydrogen atoms which are super thermal by 17.5–27.2 kcal./mole . . . so called hot hydrogen atoms. This energy is available for the dissociation of the ingredients in the precursor mixture. The result is that chain reactions are initiated in which various intermediates are combined, redissociated and still further combined in a complex series of reactions which finally produce mixtures of amino acids and polypeptides as the ultimate stable molecules. The original mixture containing hydrogen sulfide is a reducing mixture. Other useful reducing mixtures containing other photon acceptors useful in this invention can also be utilized. A relatively wide variety of photon acceptors are suitable but those which are most readily available economically, most convenient to work with and therefore preferred, are hydrogen sulfide, sulfur dioxide, aldehydes, particularly formaldehyde, containing up to about four carbon atoms, and ketones containing up to about six carbon atoms.

FIG. 1 shows a typical apparatus in which the process of this invention can be carried out. The system is a closed system including gas conduits 1, 2, 3 and 4, A topcock 5 provides an inlet for the gaseous mixture. A convenient source of water vapor is liquid water stored in water bath 6. The mixture is kept in motion with a greaseless solenoid pump 7 having solenoid bindings 8 and 9 and glass enclosed iron plunger 10. A well 11 is fused into reaction vessel 12, and is equipped with a conduit 13 for the passage of water to cool the ultraviolet light source 14 which may, for example, be a mercury arc lamp. Gas conduit 4 may be equipped with a condenser 15 to cool the flowing gaseous mixture. The apparatus may be modified to provide for continuous operation.

The preferred temperature for carrying out the conversion is room temperature, i.e. from about 20° C. to 40°

C. The energy source often generates a considerable quantity of heat energy especially if it is not cooled. In extending reactions the temperature may reach as high as 300° C. or 400° C. but temperatures as high as these, or even higher, do not adversely affect the reaction.

Pressure is not a factor in the preparation of amino acids according to this invention. Any convenient pressure such as produced by the solenoid pump illustrated, or indeed by any other pump which might be used to circulate the gases, may be employed.

Some amino acids are produced very quickly from the original exposure of the gaseous mixture to the energy source. However, for optimum yields it is preferred that the reaction be carried out for a rather extended period of time. As with fermentation reactions the optimum period will very often be selected on the basis of economic factors such as the slope of the yield-time curve which tends to decrease with increasing time. Thus after a particular reaction time increment it becomes too expensive to obtain a modest increase in yield by continuing the reaction for a further increment of time. Often factors such as production schedules and availability of separation and purification equipment may also enter into consideration. Suitable yields are generally obtained during reaction periods of from about 2 to 25 days, preferably 7 to 10 days.

The relative proportions of the separate ingredients in the mixture used to produce the amino acids in accordance with this invention may vary within extremely wide limits. Equimolar quantities of each ingredient may be used, or one or more of the ingredients may be present in as much as 200% or 300% molar excess.

The energy source utilized in the practice of the invention, as is indicated above, may be any source capable of producing either continuous or intermittent energy in the near ultraviolet region of the spectrum, i.e. from about 2000 A. to 4000 A. An excellent and preferred source is a mercury arc lamp which has an emission line at 2537 A.

The products of this invention generally accumulate as relatively complex mixtures on the walls of the reaction vessel and if a water bath is used, as illustrated in the figure, may dissolve in the water. In any event the mixture is readily separated into its component amino acids or polypeptide constituents using standard procedures generally applicable to such separations. They may, for example, be taken up in a suitable solvent and separated chromatographically on silica gel, Sephadex, aminex or other absorption column using solvents and solvent mixtures of varying polarity, for example, ammonia methanol mixtures, methanol-water-ammonia mixtures, pyridine-acetate buffers, and others well known to those skilled in the art. Polypeptides produced in the process may, if desired, be hydrolyzed to obtain the constituents which may also be isolated chromatographically.

The following non-limiting examples are given by way of illustration only.

Example 1

This example is carried out in the reaction vessel shown in FIG. 1.

A mixture containing the following ingredients

|  | Cc. |
|---|---|
| Methane | 541 |
| Ethane | 2010 |
| Ammonia | 1000 |
| Hydrogen sulfide | 549 | is introduced into the system through the stopcock and circulated throughout the system by the pump. The circulating gaseous mix passes through the water bath containing fifteen cubic centimeters of water. The irradiation source is a mercury line emission source with an emission line of 2537 A. The mixture is circulated through the system including the reaction vessel for nine days. The temperature in the reaction vessel reaches a maximum of about 400° C. The temperature in the water bath is varied from about 70° C. to 90° C. during the first two days and thereafter allowed to cool to 25° C.

During the exposure period an orange-brown viscous liquid accumulates on the walls of the vessel. It is collected and analyzed by two dimensional paper chromatography. The solvent mixtures are methanol, n-butanol, water and ammonia (10:10:5:2) and acetone, n-butanol, water and ammonia (10:10:5:2). The presence of alanine, glycine, cystine, serine, glutamic acid and aspartic acid in the mix is confirmed by comparison of authentic samples of these amino acids under the same chromatographic conditions.

In additional examples the viscous liquid and the mixture in the water bath are analyzed using an Hitachi model KLA-3B amino acid analyzer to confirm the production of the same amino acids.

In additional examples the amino acids are isolated from the viscous liquid mixture by elution from silica gel columns using standard chromatographic procedures.

Similar results are obtained by replacing hydrogen sulfide with an equivalent amount of sulfur dioxide.

Example 2

Example 1 is repeated except that the exposure time is 25 days and the temperature in the reaction vessel is 50° C. The liquid which collects is predominantly brownish. An aliquot of the liquid is analyzed on a Beckman model 120B amino acid analyzer which establishes the production of alanine.

Another aliquot of the liquid is subjected to acid hydrolysis for 22 hours in 5.7 N HCl at 105° C. After drying in vacuum the acid hydrolysis mix is similarly analyzed to establish the production of glycine, serine, cystine, aspartic and glutamic acids.

In additional examples the same amino acids are isolated from the acid hydrolysis mix using standard chromatographic procedures. These procedures are also utilized on the original non-hydrolyzed mix to isolate low molecular weight polypeptides containing the same amino acids.

Similar results are obtained using other photon acceptors such as aldehydes containing up to four carbon atoms and ketones containing up to six carbon atoms.

What is claimed is:

1. A process for the production of amino acids which comprises forming a precursor gaseous mixture containing water vapor, a nitrogen source selected from the group consisting of nitrogen and ammonia, at least one hydrocarbon containing from two to about eight carbon atoms together with a near ultraviolet photon acceptor selected from the group consisting of hydrogen sulfide, sulfur dioxide, aldehydes containing up to about four carbon atoms and ketones containing up to about six carbon atoms which will dissociate when exposed to electromagnetic energy in the near ultraviolet region of the spectrum with sufficient energy to effect bond dissociation of the ingredients in the precursor gaseous mixture thereby to initiate chain reactions, and exposing said mixture to such electromagnetic energy thereby to produce amino acids.

2. A process for the production of amino acids which comprises forming a precursor gaseous mixture containing methane, ethane, ammonia, water vapor and hydrogen sulfide and exposing such mixture to electromagnetic energy in the near ultraviolet region of the spectrum thereby to initiate chain reactions resulting in the production of amino acids.

3. A process as in claim 2 wherein the energy source includes the mercury emission resonance line at 2537 A. units.

4. A process for the production of amino acids which comprises forming a precursor gaseous mixture containing methane, ethane, ammonia, water vapor and formaldehyde and exposing such mixture to electromagnetic energy in the near ultraviolet region of the spectrum thereby to initiate chain reactions resulting in the production of amino acids.

5. A process as in claim 4 wherein the energy source includes the mercury emission resonance line at 2537 A. units.

6. A process for the production of amino acids which comprises forming a precursor gaseous mixture containing natural gas, ammonia, water vapor and hydrogen sulfide and exposing such mixture to electromagnetic energy in the near ultraviolet region of the spectrum thereby to initiate chain reactions resulting in the production of amino acids.

7. A process as in claim 6 wherein the energy source includes the mercury emission resonance line at 2537 A. units.

8. A process for the production of amino acids which comprises forming a precursor gaseous mixture containing natural gas, ammonia, water vapor and formaldehyde and exposing such mixture to electromagnetic energy in the near ultraviolet region of the spectrum thereby to initiate chain reactions resulting in the production of amino acids.

9. A process as in claim 2 wherein the energy source includes the mercury emission resonance line at 2537 A. units.

References Cited
UNITED STATES PATENTS 2,956,938  10/1960  Vaughan _____ 204—162 HE
3,578,576   5/1971  Kliss et al. _____ 204—162 HE BENJAMIN R. PADGETT, Primary Examiner U.S. Cl. X.R.

204—158 R